United States Patent Office 2,782,646
Patented Feb. 26, 1957

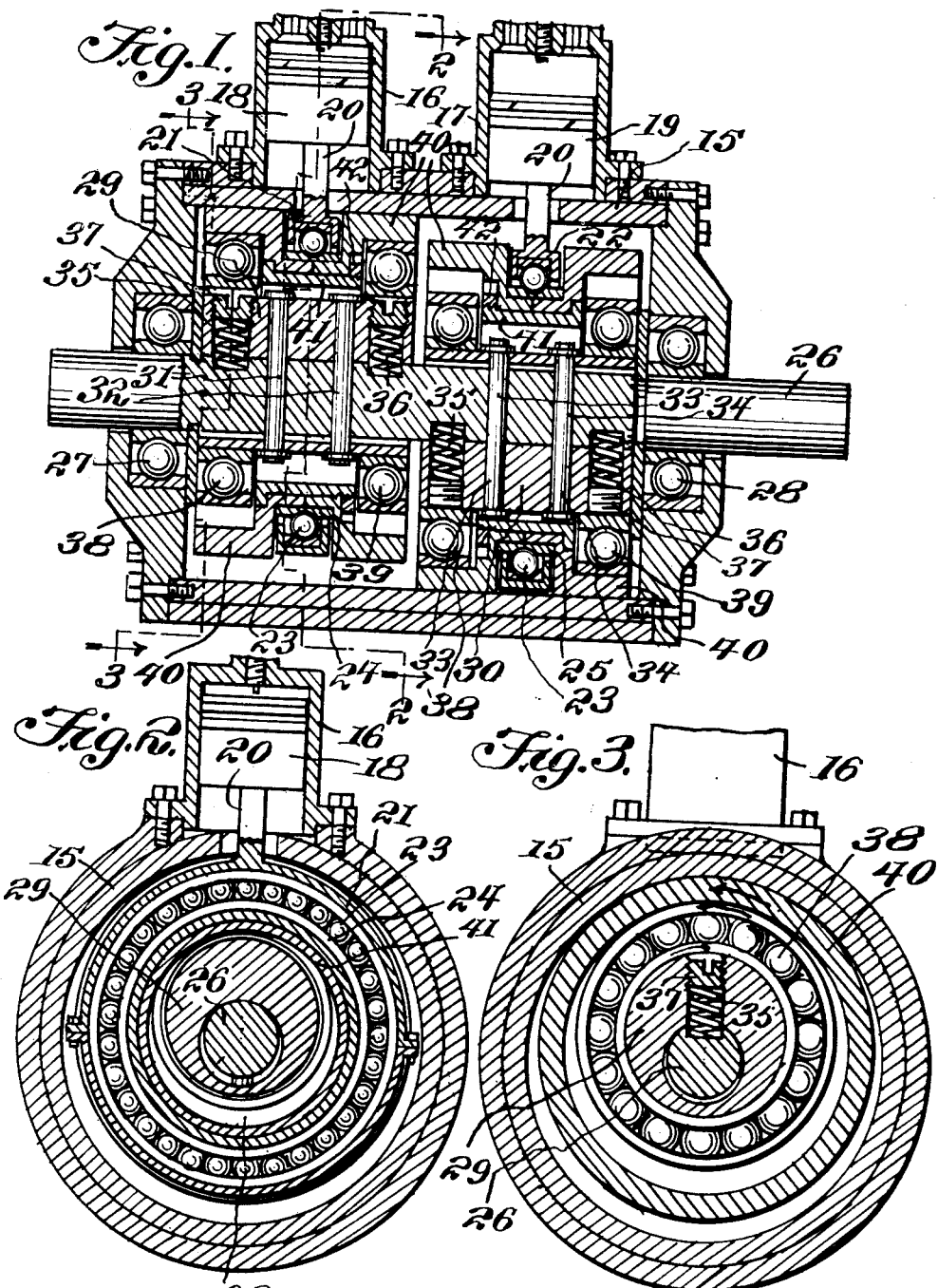

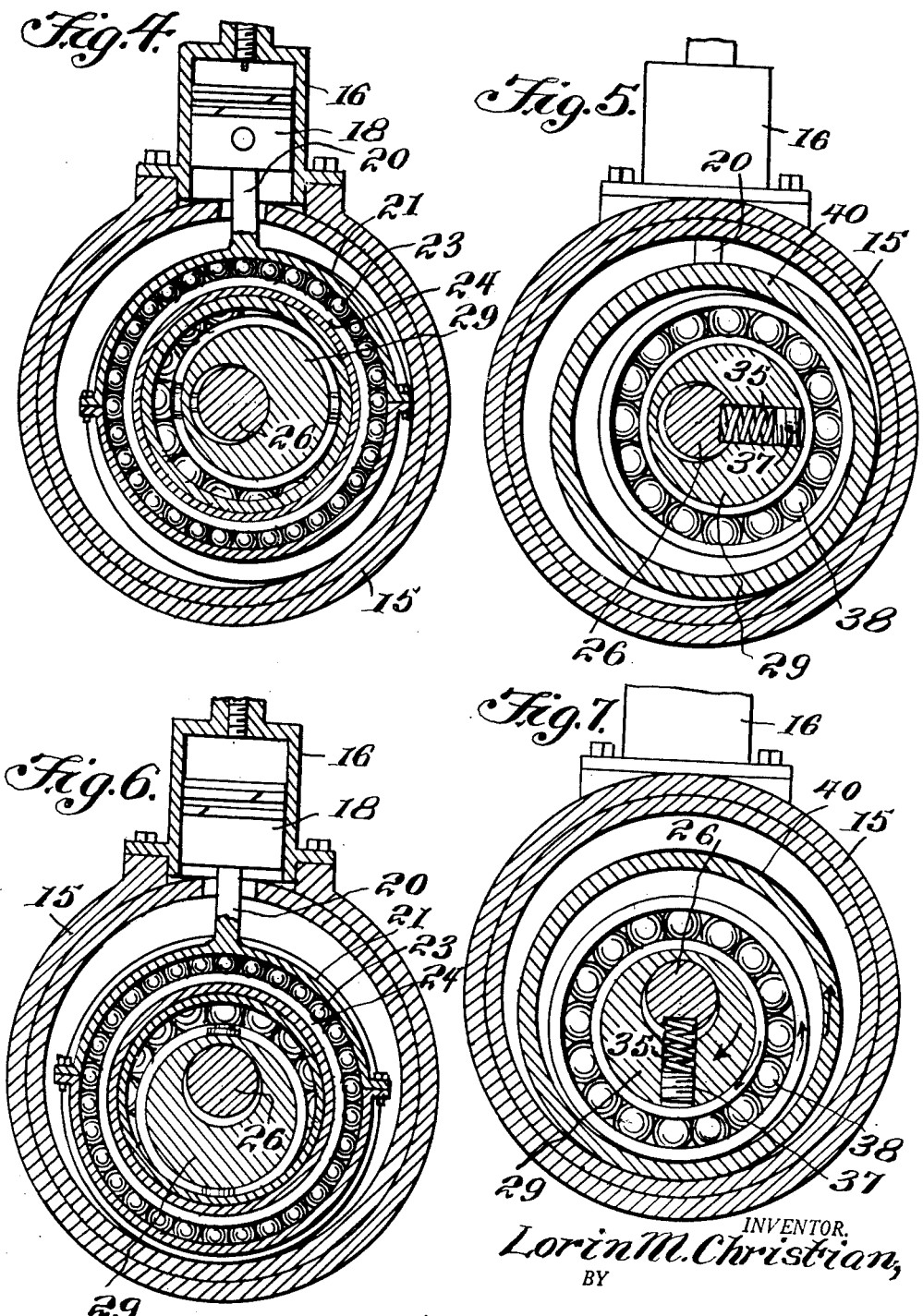

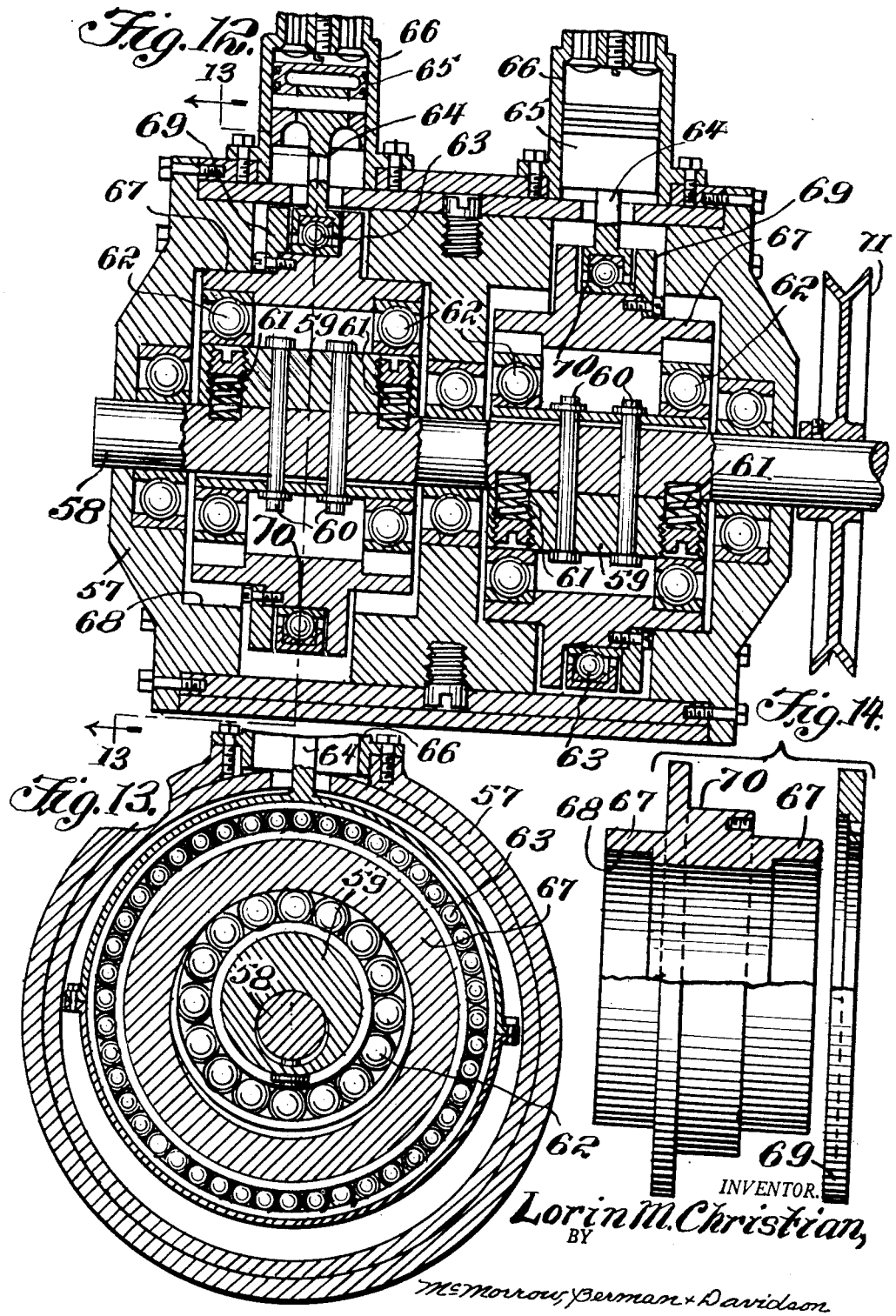

2,782,646

MECHANISM FOR CONVERTING ROTARY MOTION TO OR FROM RECIPROCATING MOTION

Lorin M. Christian, Atlanta, Ga.

Application February 23, 1955, Serial No. 490,003

5 Claims. (Cl. 74—44)

The present invention relates to mechanisms for converting rotary motion to or from reciprocating motion.

The primary object of the present invention is to provide a mechanism which produces a smoothly operable, friction free connection between a reciprocating piston and a driven shaft.

Another object of the present invention is to provide means for connecting the pistons of an engine to a driven shaft, and one in which said means is simple in structure, of sturdy construction, one easily assembled and disassembled, and one having long wearing characteristics, with rolling friction free contacts of the opposed elements eliminating all sliding contacts normally associated with reciprocating pistons having connecting rods and bearings mounted on a crank shaft.

Figure 8:
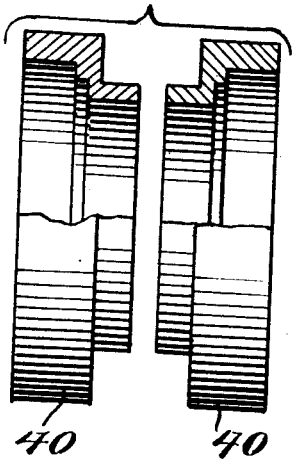
Figure 9:
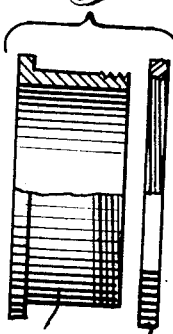
Figure 10:
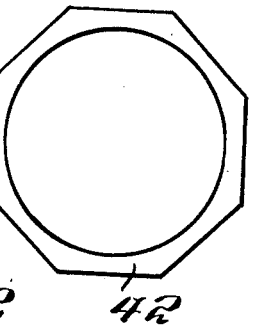
Figure 11:
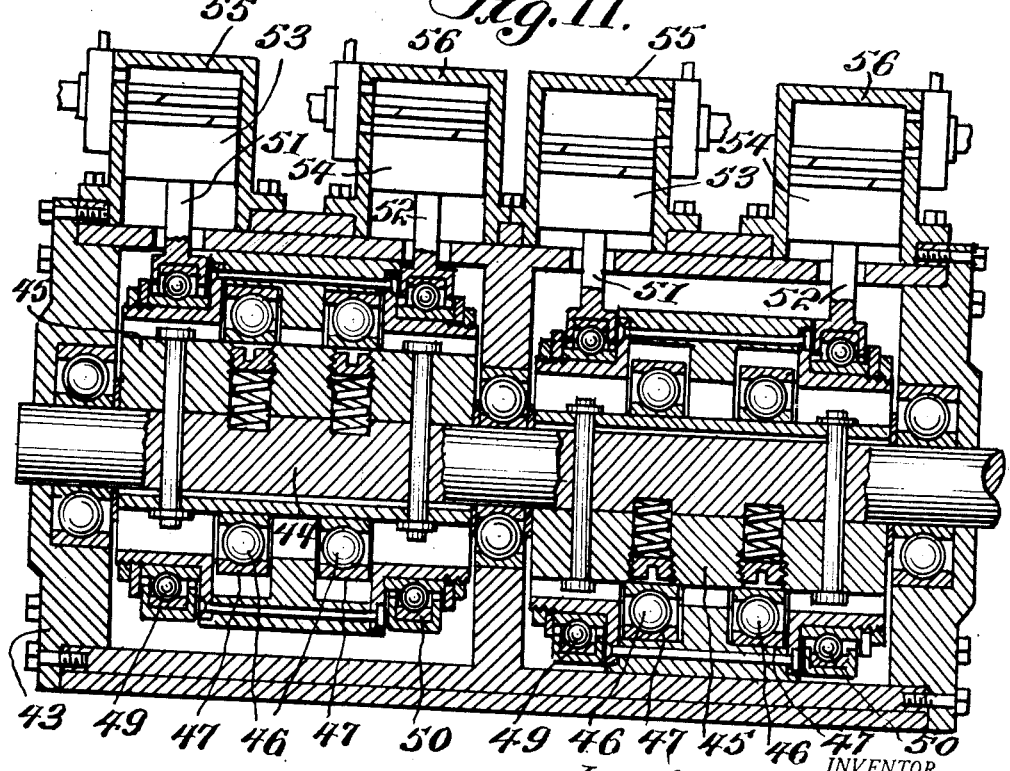

These and other objects of the present invention will be fully apparent from the following description when taken in connection with the annexed drawings, in which:

Figure 1 is a side view in cross-section of a first embodiment of the mechanism of the present invention, illustrating two pistons, the one at the left-hand being at the beginning of its power stroke with the associated body in its position of least eccentricity with respect to the shaft and the other at the right-hand being at the conclusion of its power stroke with the associated body in its position of least eccentricity with respect to the shaft, Figure 2 is an end view in cross-section on line 2—2 of Figure 1, illustrating the piston at the beginning of its power stroke with the body moved to its position of least eccentricity with respect to the shaft, Figure 3 is another end view in cross section on line 3—3 of Figure 1, illustrating the spring in its compressed condition with the body moved to its position of least eccentricity with respect to the shaft, or the position shown in Figure 2, Figure 4 is a sectional view of the assembly of Figure 2 illustrating the piston after it has partially executed its power stroke with the body still in its position of least eccentricity with respect to the shaft, but shifted 90 degrees from the position in Figure 2, Figure 5 is a sectional view of the assembly of Figure 3 illustrating the spring in its compressed condition, but turned 90 degrees from the position of Figure 3 with the body still in the position of least eccentricity with respect to the shaft, but turned 90 degrees or the position of Figure 4, Figure 6 is a sectional view of the assembly of Figure 2 illustrating the piston after it has executed its power stroke with the body moved a further 90 degrees from the position of Figure 4 and to its position of greatest eccentricity with respect to the shaft, Figure 7 is a sectional view of the assembly of Figure 3 illustrating the spring in its relaxed condition, but shifted a further 90 degrees from the position of Figure 5, after the body has been moved to the position of greatest eccentricity with respect to the shaft or the position of Figure 6, Figure 8 is an elevational view partially in cross-section of the ring component of the present invention, Figure 9 is an elevational view partially in cross-section of the sleeve and sleeve nut components which are used to assemble the ring component shown in Figure 9, Figure 10 is a front elevational view of the sleeve nut seen in Figure 9, Figure 11 is a side view in cross-section of a second embodiment of the present invention, Figure 12 is a side view in cross-section of a third embodiment of the present invention, Figure 13 is an end view in cross-section on line 13—13 of Figure 12, and Figure 14 is an elevational view partially in cross-section of the ring component of the internal combustion engine shown in Figure 12.

Referring in greater detail to the drawings in which like numerals indicate like parts throughout the several views, the present invention consists of a mechanism for converting rotary motion to or from reciprocating motion, such as is used for connecting the piston of an internal combustion engine to a driven shaft and is shown in a first embodiment in Figures 1 to 10, inclusive, in a second embodiment in Figure 11, and in a third embodiment in Figures 12 to 14, inclusive.

Referring to Figures 1 and 2, a housing 15 has a pair of cylinders 16 and 17 projecting transversely of the housing 15 from the topside of the latter. A pair of reciprocating pistons 18 and 19 work within the cylinders 16 and 17, respectively, and are connected by the connecting rods 20 to the outer races 21 and 22, respectively, of a pair of friction bearings having balls 23 and inner races 24 and 25, respectively.

A shaft 26 extends transversely through the housing 15 with its ends extending outwardly from each end of the housing and having an end portion supported for rotation in each end of the housing 15 by means of the bearings 27 and 28.

A pair of cylindrical bodies 29 and 30 surround and are disposed eccentrically on the shaft 26 and are connected to the shaft 26 by means of the pairs of pins 31, 32, 33 and 34, respectively, which permit limited radial movement of each of the cylindrical bodies 29 and 30 in the direction of their eccentricity relative to the shaft 26.

A pair of springs 35 and 36 have their one ends seated in recesses in the shaft 26 and project by their other ends through threaded bores provided in each of the cylindrical bodies 29 and 30, respectively. A threaded plug 37 adjusts the compression of each of the springs 35 and 36 associated with either of the cylinders 16 and 17 to bias the cylindrical bodies 29 and 30 away from the shaft 26 to the position of their greatest eccentricity.

A pair of anti-friction bearings 38 and 39 are associated with each cylinder 16 and 17 and are disposed in side by side spaced relation about the shaft 26, one on each side of the bearings having their outer races 21 and 22 connected to the connecting rods 20 of the piston 18 and 19, respectively.

The bearings 38 and 39 are conformally shaped to fit the outer periphery of the respective bodies 29 and 30 and each has its inner race or raceway connected to the associated body.

A ring 40 surrounds each of the bearings 38 and 39 and rotatably engages by its inner periphery the outer race or raceway of each of the bearings 38 and 39 for support thereon with a single line contact, the ring 40 being dimensioned larger than the outer raceways of the bearings 38 and 39. The outer periphery of the ring 40 rolls in single line contact engagement with the inner wall of the housing 15.

The rings 40, one associated with each of the cylinders 16 and 17, are shown in Figure 8 in greater detail and are seen to have a central recess which receives the antifriction bearing connected by its outer raceway to the connecting rods 20 associated with each of the cylinders 6 and 17. A sleeve 41 and a sleeve nut 42 form means by which the ring 40 is assembled within the housing with the inner raceway 24 or 25 seated within the recess and secured to the ring 40. It will be seen at Figures 5 and 7 that the ring 40 rolls in an eccentric movement around the inner wall of the housing in the directions of the arrows when the piston 18 makes its downstroke or power stroke, causing the body 29 to rotate in the opposite direction, carrying with it the inner raceway of the bearing 38.

On the return, or upstroke, the pistons 18 and 19 will pull their respective cylindrical bodies 29 and 30 in the continued direction, their momentum carrying them past the top and bottom dead centers. The springs 35 and 36 bias the cylindrical bodies 29 and 30 outwardly from the shaft 26 to take up any play which may be present between the rolling rings 40 and the inner wall of the housing and between the rolling rings 40 and the outer peripheries of the bearings 38 and 39.

As the bodies 29 and 30 rotate within the housing, the rolling line contact of the ring 40 with the inner wall of the housing and with the outer raceway of the bearings 38 and 39 continually changes, causing the ring 40 to rotate a portion of a revolution for each complete revolution of the shaft 26.

Referring to Figure 11, the housing 43 of this embodiment of the present invention has rotatably supported therein a shaft 44 carrying the cylindrical bodies 45. Bearings 46 are conformably shaped to fit the outer periphery of the cylindrical body 45 and are secured to the cylindrical body with their inner races in engagement therewith. The outer races 47 of the bearings 46 are in rolling engagement with the inner periphery of a ring 48, the latter being connected to the inner raceways of the bearings 49 and 50 disposed in side by side spaced relation one on each side of the pair of bearings 46.

The outer raceways of the bearings 49 and 50 are connected to the connecting rods 51 and 52, respectively, associated with the pistons 53 and 54 within the cylinders 55 and 56, respectively. Similar pins and springs connect the cylindrical bodies 45 on each side of the shaft 44 for limited radial movement in the direction of the eccentricity of the body 45 with respect to the shaft 44.

In Figures 12 to 14, inclusive, a third embodiment of an antifriction mechanism constructed according to the present invention is shown. The housing 57 of this embodiment supports by its ends the shaft 58 for rotation therein with a cylindrical body 59 secured adjacent each end of the shaft for rotation therewith and connected to the shaft by means of pins 60 and springs 61 which bias the cylindrical bodies 59 away from the shaft 58 to their position of greatest eccentricity to take up the slack of the bearings 62.

The bearings 62 are arranged in side by side spaced relation one on each side of another bearing 63 which is connected by its outer raceway to the connecting rod 64 of the piston 65 operating within the cylinder 66. The outer raceway of each of the bearings 62 rolls within the inner periphery and in engagement with the inner periphery of a ring 67 which is fixedly secured to the inner raceway of the bearing 63 and which rules with its outer periphery in engagement with a shoulder 68 formed on the inner wall of the housing 57.

As shown in Figure 14, the ring 67 is closed by means of a collar 69 so that the bearing 63 fits within the recess indicated by the reference numeral 70.

Each of the projecting shafts 26, 44, and 58 is adapted to be connected by means such as the pulley 71 shown connected to the shaft 58 to a source of rotative energy such as an engine or to a driven rotative element such as a pump, a vehicle transmission, or the like.

The present invention may be used to convert rotary motion to reciprocating motion or reciprocating motion to rotary motion.

In use, each of the internal combustion engines above described operates with a minimum of resistance and is, for all purposes, entirely friction free, there being no sliding surfaces of the elements except the sliding friction of the piston within its associated cylinder.

The transfer of reciprocating power to rotary movement is accomplished by the present invention in each of its three forms here shown efficiently, smoothly, and without vibration.

What is claimed is:

1. A mechanism for converting rotary motion to or from reciprocating motion comprising a housing, said housing being provided with means intermediate its ends for connection of a reciprocating drive element thereto, a shaft extending transversely through said housing and rotatably supported in the ends of said housing and having each of its ends exteriorly of the adjacent end of said housing, each of the projecting ends of said shaft being adapted for connection to a rotary drive element, a cylindrical body surrounding and disposed eccentrically with respect to said shaft connected to said shaft for rotation therewith, an antifriction bearing, having inner and outer raceways, conformably shaped to fit and surrounding the outer periphery of said body and having the inner raceway connected to said body, a ring surrounding said bearing and having the inner periphery rotatably engaging and supported on the outer raceway of said bearing, said ring having its outer periphery engaging the inner surface of said housing, and another antifriction bearing having inner and outer raceways eccentrically disposed about said shaft and having the inner raceway fixed to said ring, said another bearing having its outer raceway adapted for connection to a reciprocating drive element.

2. A mechanism for converting rotary motion to or from reciprocating motion comprising a housing, said housing being provided with means intermediate its ends for connection of a reciprocating drive element thereto, a shaft extending transversely through said housing and rotatably supported in the ends of said housing and having each of its ends exteriorly of the adjacent end of said housing, each of the projecting ends of said shaft being adapted for connection to a rotary drive element, a cylindrical body surrounding and disposed eccentrically with respect to said shaft, means connecting said body to said shaft for rotation therewith and for limited radial movement of said body with respect to said shaft in the direction of its eccentricity, an antifriction bearing, having inner and outer raceways, conformably shaped to fit and surrounding the outer periphery of said body and having the inner raceway connected to said body, a ring surrounding said bearings and having the inner periphery rotatably engaged and supported on the outer raceway of said bearing, said ring having its outer periphery engaging the inner surface of said housing, and another antifriction bearing having inner and outer raceways eccentrically disposed about said shaft and having the inner raceway fixed to said ring, said another bearing having its outer raceway adapted for connection to a reciprocating drive element.

3. A mechanism for converting rotary motion to or from reciprocating motion comprising a housing, said housing being provided with means intermediate its ends for connection of a reciprocating drive element thereto, a shaft extending transversely through said housing and rotatably supported in the ends of said housing and having each of its ends exteriorly of the adjacent ends of said housing, each of the projecting ends of said shaft being adapted for connection to a rotary drive element, a cylindrical body surrounding and disposed eccentrically with respect to said shaft, means connecting said body to said shaft for rotation therewith and for limited radial movement of said body with respect to said shaft in the direction of its eccentricity, said means including spring means biasing said body outwardly from said shaft to the position of greatest eccentricity, an antifriction bearing, having inner and outer raceways, conformably shaped to fit and surrounding the outer periphery of said body and having the inner raceway connected to said body, a ring surrounding said bearing and having the inner periphery rotatably engaging and supported on the outer raceway of said bearing, said ring having its outer periphery engaging the inner surface of said housing, and another antifriction bearing having inner and outer raceways eccentrically disposed about said shaft and having the inner raceway fixed to said ring, said another bearing having its outer raceway adapted for connection to a reciprocating drive element.

4. A mechanism for converting rotary motion to or from reciprocating motion comprising a housing, said housing being provided with means intermediate its ends for connection of a reciprocating drive element thereto, a shaft extending transversely through said housing and rotatably supported in the ends of said housing and having each of its ends exteriorly of the adjacent end of said housing, each of the projecting ends of said shaft being adapted for connection to a rotary drive element, a cylindrical body surrounding and disposed eccentrically with respect to said shaft connected to said shaft for rotation therewith, a pair of antifriction bearings, each having inner and outer raceways, disposed in side by side spaced relation conformably shaped to fit and surrounding the outer periphery of said body, each of said bearings having its inner raceway connected to said body, a ring surrounding said bearings connecting them together and having the inner periphery rotatably engaging and supported upon the outer raceways of said bearings, said ring having its outer periphery engaging the inner surface of said housing, and another antifriction bearing having inner and outer raceways eccentrically disposed about said shaft between said pair of bearings and having the inner raceway fixed to said ring, said another bearing having its outer raceway adapted for connection to a reciprocating drive element.

5. A mechanism for converting rotary motion to or from reciprocating motion comprising a housing, said housing being provided with means intermediate its ends for connection of a reciprocating drive element thereto, a shaft extending transversely through said housing and rotatably supported in the ends of said housing and having each of its ends exteriorly of the adjacent end of said housing, each of the projecting ends of said shaft being adapted for connection to a rotary drive element, a cylindrical body surrounding and disposed eccentrically with respect to said shaft and connected to said shaft for rotation therewith, a pair of antifriction bearings having inner and outer raceways and each conformably shaped to fit and surrounding the outer periphery of said body and having their inner raceways connected to said body, a ring surrounding each of said bearings connecting them together and having the inner periphery rotatably engaging and supported upon the outer raceway of each of said bearings, said ring having its outer periphery engaging the inner surface of said housing, a pair of other antifriction bearings each having inner and outer raceways eccentrically disposed about said shaft in side by side spaced relation exteriorly of said first-named pair of antifriction bearings and having the inner raceway of each fixed to said ring, said pair of other bearings having their outer raceways adapted for connection to a reciprocating drive element.

References Cited in the file of this patent

UNITED STATES PATENTS

| | | |
|---|---|---|
| 1,056,746 | Pitts | Mar. 18, 1913 |
| 1,326,129 | Chadbourne | Dec. 23, 1919 |
| 1,867,981 | Mudd | July 19, 1932 |
| 2,506,693 | Voisin | May 9, 1950 |